June 6, 1967 — J. J. SUMMERS — 3,323,963
METHOD OF MAKING FILTER COIL
Filed Jan. 8, 1964 — 4 Sheets-Sheet 1

INVENTOR.
JAMES J. SUMMERS.
BY
Brown, Critchlow, Flick & Peckham.
ATTORNEYS.

June 6, 1967  J. J. SUMMERS  3,323,963
METHOD OF MAKING FILTER COIL
Filed Jan. 8, 1964  4 Sheets-Sheet 2

INVENTOR.
JAMES J. SUMMERS.
BY
Brown, Critchlow, Flick & Peckham.
ATTORNEYS.

June 6, 1967        J. J. SUMMERS        3,323,963

METHOD OF MAKING FILTER COIL

Filed Jan. 8, 1964        4 Sheets-Sheet 3

INVENTOR.
JAMES J. SUMMERS.
BY
Brown, Critchlow, Flick & Peckham.
ATTORNEYS.

June 6, 1967 J. J. SUMMERS 3,323,963
METHOD OF MAKING FILTER COIL
Filed Jan. 8, 1964 4 Sheets-Sheet 4

INVENTOR.
JAMES J. SUMMERS.
BY
Brown, Critchlow, Flick & Peckham.
ATTORNEYS.

United States Patent Office 3,323,963
Patented June 6, 1967

3,323,963
METHOD OF MAKING FILTER COIL
James J. Summers, Bethel Park, Pa., assignor to Mine Safety Appliances Company, Pittsburgh, Pa., a corporation of Pennsylvania
Filed Jan. 8, 1964, Ser. No. 336,493
3 Claims. (Cl. 156—192)

This invention relates to a method of making a filter by rolling filtering material into a coil, the axis of which extends lengthwise of the fluid stream being filtered. The filtering material includes an assembly of separator and filtering strips with cord elements disposed between the strips along the edges thereof, so that upon subsequent coiling and dipping of both ends of the coil into sealant material, the cord elements serve as limiting means for the extension of the sealant into the ends of the coil while also preventing the sealant in the lower and upper spiral channels from running down into the coil during the curing of the sealant.

Spiral filters or filter coils are shown in Bub Patents 3,037,637 and 3,076,554. In such coils there are two adjoining spiral filter passages, one closed at one end of the coil and the other at the other end so that fluid has to pass through the walls of the passages in order to pass through the coil. The filters shown in those patents perform very satisfactorily, but one of them requires a filter strip to be folded around the side edges of the separator strips, while the other requires the addition to the edges of the filter strips of means for sealing them together after the coil has been formed. These steps add to the cost of making the filters.

It is among the objects of this invention to provide a method of making a filter coil of the type just referred to which is simpler and less expensive than the methods known heretofore.

The invention is illustrated in the accompanying drawings, in which

Figure 1:
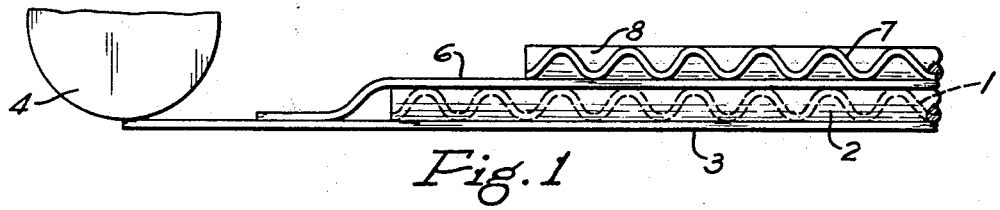
Figure 2:
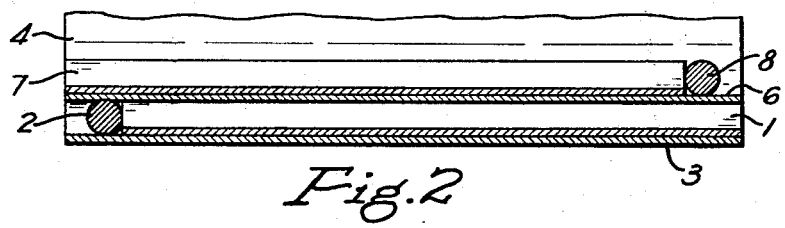
Figure 3:
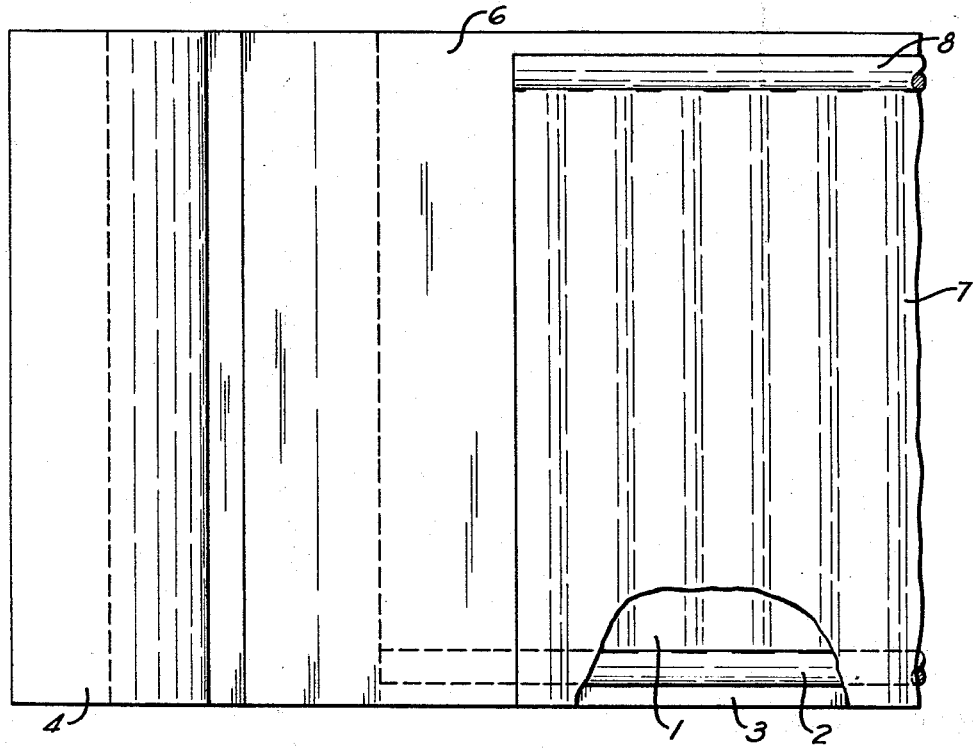
Figure 4:
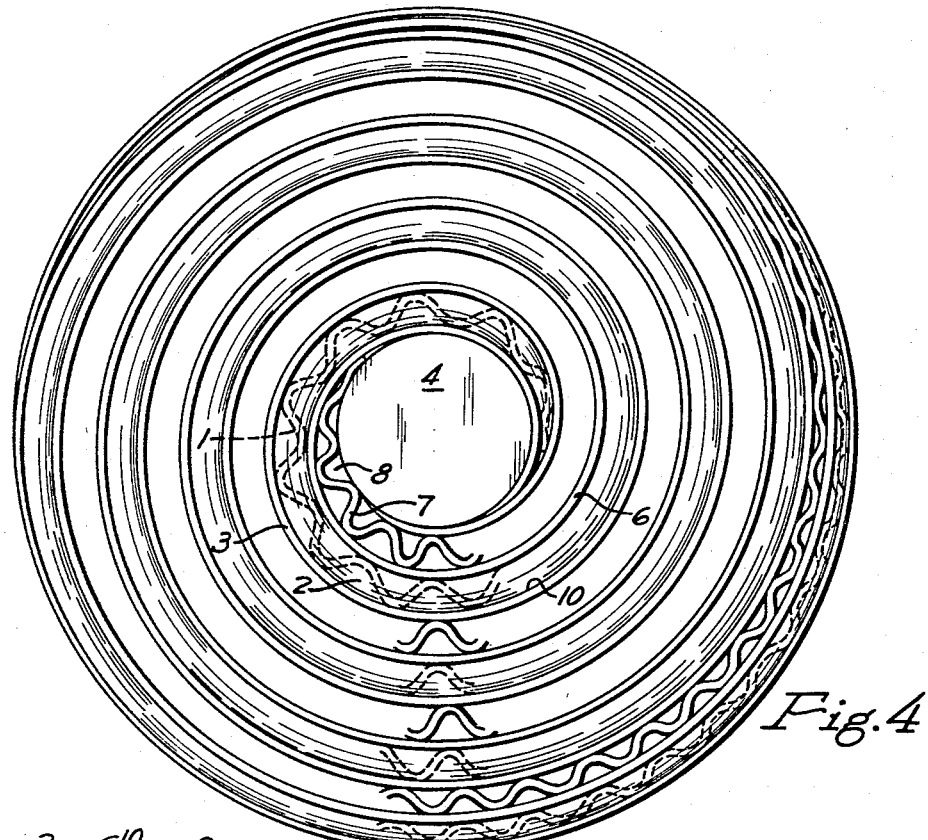
Figure 7:
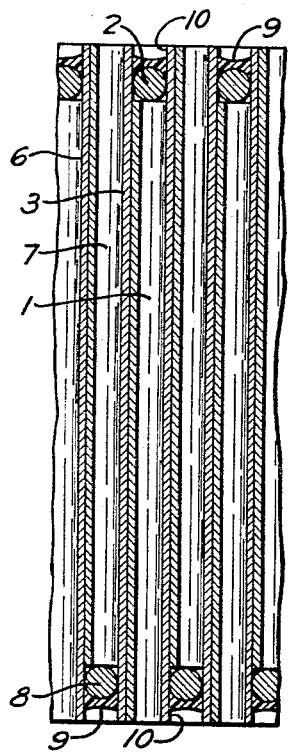
Figure 5:
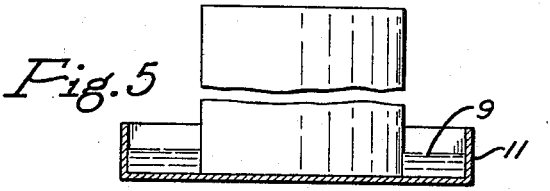
Figure 6:
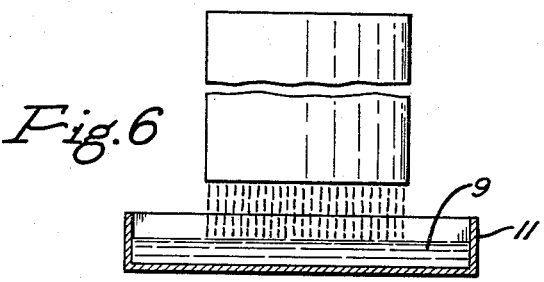
Figure 8:
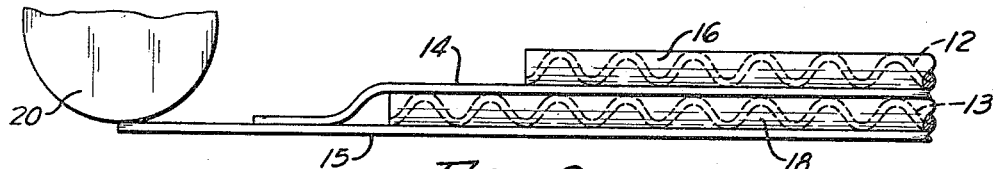
Figure 9:
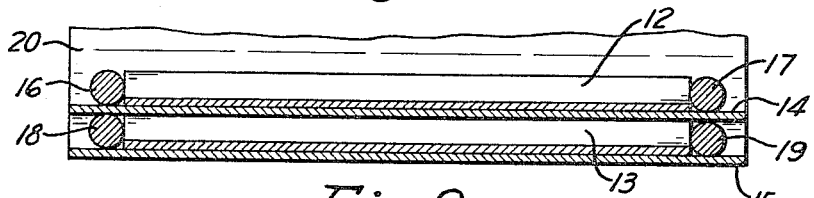
Figure 10:
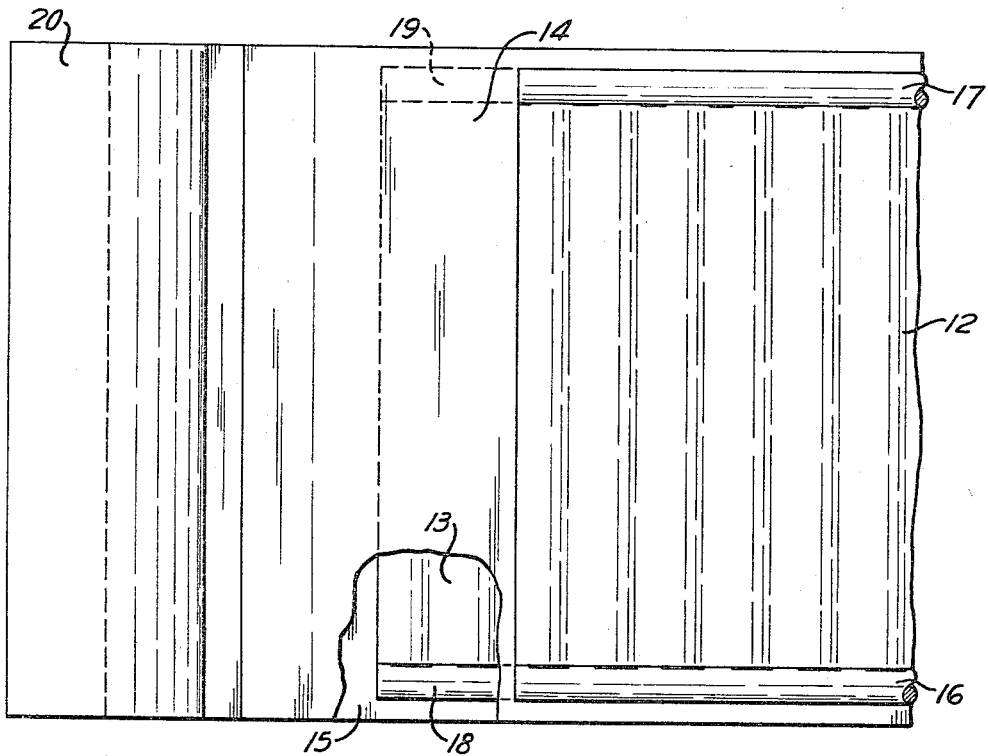
Figure 13:
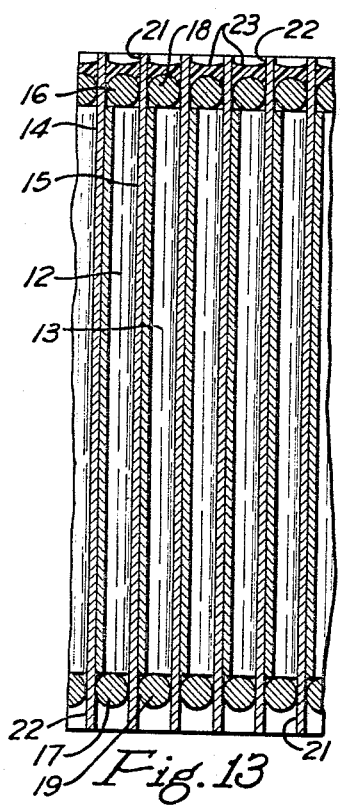
Figure 14:
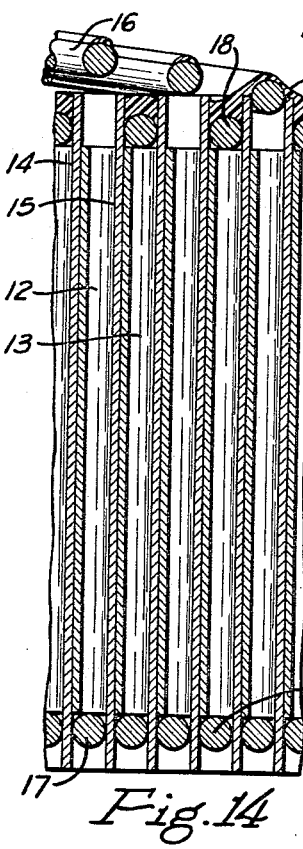
Figure 15:
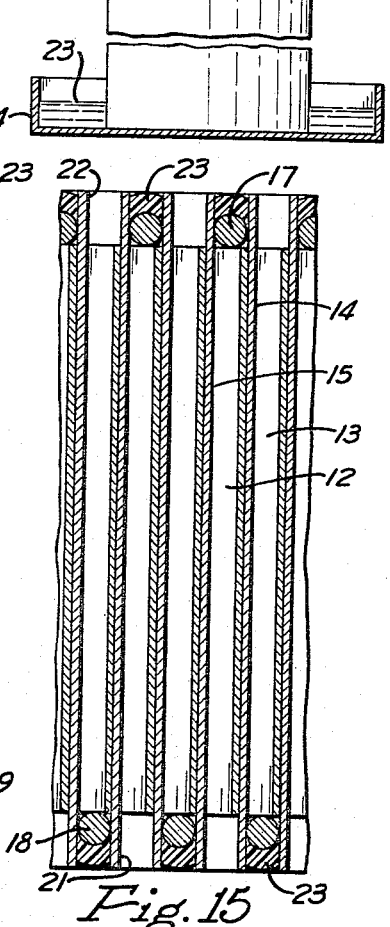

FIG. 1 is a fragmentary edge view of an assembly of superimposed filtering strips and separator strips;
FIG. 2 is a cross section thereof;
FIG. 3 is a fragmentary plan view of the strip assembly;
FIG. 4 is an end view of the coil formed from the strips;
FIG. 5 is a reduced side view of the coil showing it being dipped in a plastic sealant;
FIG. 6 is a view similar to FIG. 5, but showing the coil lifted from the sealant to drain the sealant from one of the fluid passages;
FIG. 7 is a fragmentary radial section of the completed coil;
FIGS. 8 to 12 are views of a modification of this invention corresponding, respectively, to FIGS. 1 to 5;
FIG. 13 is an enlarged fragmentary radial section of the coil shown in FIG. 12 after it has been inverted;
FIG. 14 is a view similar to FIG. 13, but showing one of the upper cords being removed; and
FIG. 15 is a fragmentary radial section of the finished coil.

Referring to FIGS. 1 to 3 of the drawings, a separator strip 1 of suitable form, preferably corrugated, is made of aluminum or some other impervious material from which the sealant that is to be used later in the process will drain. A flexible cord 2, substantially as thick as the overall thickness of the separator strip, extends along one edge of the strip. The strip and cord are laid upon a wider strip 3 of filtering material that projects laterally beyond the cord, but the opposite edges of the two strips preferably are substantially flush with each other. One end of the filtering strip is secured to a closed end or solid core 4. The length of the two strips will depend on the diameter of the filter coil that is to be made from them.

A second filtering strip 6, having substantially the same width as the first filtering strip 3, is laid on the separator strip and projects from the same edge of it. A second separator strip 7 like the first one extends along the top of the second filtering strip, but it is spaced inwardly from the edge of strip 6 farthest from cord 2. The opposite edge of strip 7 may be substantially flush with the underlying edge of strip 6. Another cord 8 lies on the projecting portion of filtering strip 6 in engagement with the edge of separator strip 7.

The assembly or stack of strips formed in the manner just described is then rolled up into a coil around core 4 as shown in FIG. 4. The outer ends of the strips are glued together so that the coil will not unroll. The separator strips space the filtering strips apart to form two spiral passages disposed side by side. Forming the coil in this manner also creates a spiral channel 10 at each end of the coil. Each cord forms the base of a channel, the side walls being formed by the narrow portions of the filter sheets projecting beyond the cord. The cord should be thick enough to substantially engage both filter strips.

The lower end of the coil then is dipped into a suitable viscous sealant 9 in a pan 11 or the like as shown in FIG. 5. Preferably, a thermosetting vinyl plastisol is used. An air hardening sealant likewise could be used, but it would require considerable time to set or cure. When the coil is lifted from the pan as shown in FIG. 6, the sealant that was in the lower spiral channel will cling to its side walls and the cord and remain there, but the sealant that rose around the exposed separator in the other passage will drain away from it and drip back into the pan. The coil then is inverted and heated in an oven at a high enough temperature and for a long enough period of time to cure the sealant, for example, at 350° for 15 minutes. The next step is to repeat the dipping, draining and curing with the other end of the coil. The result, as shown in FIG. 7, is a coil in which one edge of one separator strip is exposed at one end of the coil and the other edge of the other separator strip is exposed at the other end of the coil. The other two edges of the separator strips are covered by the two cords and the sealant that fills the channels in which the cords are located.

It will be seen that there is no lengthwise folding of a filtering strip in this filter, and no fasteners are required for joining the edges of the two filtering strips. The cords limit the distance that the sealant can extend into the ends of the coil and help hold the plastic sealant in the lower channel when it is lifted out of the pan. They also prevent the sealant in the spiral channel from running down into the coil while the sealant is being cured.

Figure 11:
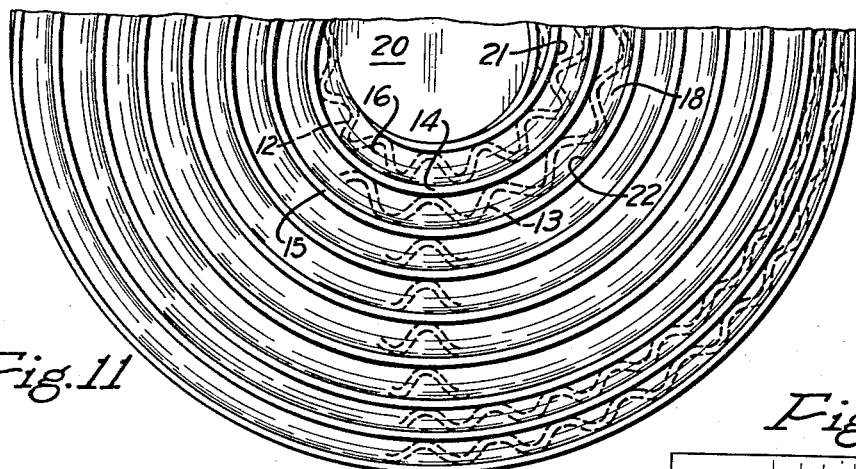

In the modification shown in FIGS. 8 to 15, the two separator strips 12 and 13 are directly above each other and each is spaced inwardly from both side edges of the filtering strip 14 or 15 on which it rests. There are cords 16 and 17 extending along both side edges of separator strip 12, and cords 18 and 19 at both side edges of the other separator strip. The filtering strips extend laterally beyond all four cords. When the stack of strips and cords is rolled into a coil around a core 20 as shown in FIG. 11, two spiral channels 21 and 22 are formed at each end of the coil, each channel being defined by a cord and the walls of the filtering strips projecting beyond it.

Figure 12:
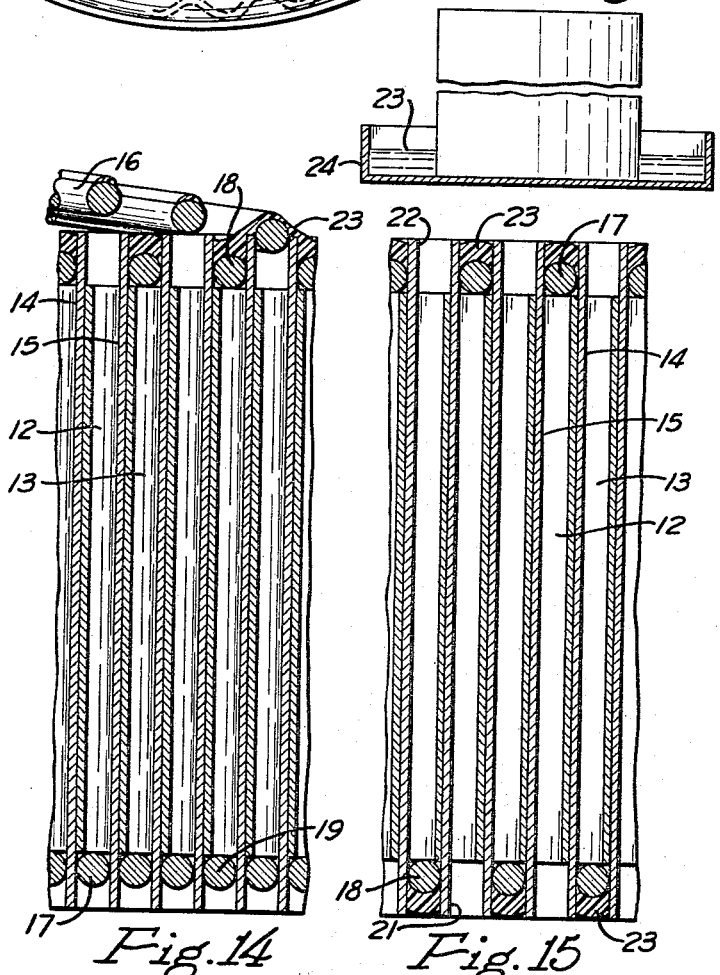

As in the first embodiment of the invention, after the coil is formed, its lower end is dipped in a viscous sealant 23 as shown in FIG. 12, which fills the two lower channels. The sealant adheres to the cords and side walls of the channels as the coil is removed from the pan 24 and immediately inverted. In the inverted position shown in FIG. 13, the sealant is prevented by the cords from running down into the separators. Then, as shown in FIG.

14, one of the upper cords, 16 for example, is pulled upwardly by one end to lift it out of its channel. As the cord rises in the channel it causes some of the plastic sealant above it to flow laterally in opposite directions into the two adjoining convolutions of the other channel and thereby adds sealant to them. Removal of this cord from the coil cleans the sealant out of the one channel so that the upper edge of the underlying separator is exposed. The coil is then placed in an oven as before, to cure the sealant in the other channel in order to seal the channel.

The next step is to dip the lower end of the coil in the sealant to fill the two bottom channels, whereupon the coil is inverted again and the cord 19 that is in the channel in line with (directly above) the cured sealant is removed to clean the sealant out of that channel and to leave the upper edge of the separator strip therein exposed. The coil then is placed in an oven again to cure the sealant in the remaining channel. In the resulting filter coil shown in FIG. 15, it will be seen that one separator strip is exposed at one end of the coil and the other separator strip is exposed at the other end. Since the cords prevent the plastic sealant from reaching the separator strips, it is not necessary in this embodiment of the invention to use separator strips from which the sealant will drain. Paperboard separators therefore are satisfactory in this case.

In either embodiment of the invention, to aid in spacing the edges of the separators from the adjacent edges of the filtering strips and to aid in holding the cords against the edges of the separator strips during assembly of the filters, additional cords may be used to fill the spaces between the cords already described and the edges of the filtering sheets. These additional cords are pulled out of the spiral channels after the coils have been formed but before they have been dipped in the sealant.

I claim:

1. The method of making a filter coil, comprising laying a first separator strip with a cord extending along a side edge thereof on a first strip of filtering material that extends laterally beyond the cord, laying on the separator strip a second strip of filtering material having substantially the same width as said first filtering strip, laying on the second filtering strip a second separator strip spaced inwardly from the side edge of the second filtering strip farthest from said cord, laying a cord on the second filtering strip between its said side edge and the separator strip thereon, rolling all of said strips and cords together into a coil having at each end a spiral channel bounded by the filtering strips and a cord, said cords being thick enough to substantially engage both filtering strips, filling the channel at one end of the coil with a viscous sealant, curing the sealant, filling the channel at the other end of the coil with viscous sealant, and curing the last-mentioned sealant, whereby one edge of one separator strip is exposed at one end of the coil and the other edge of the other separator strip is exposed at the other end of the coil.

2. The method recited in claim 1, in which said filling of the channels is accomplished by dipping each end of the filter coil in the sealant, and said separator strips are formed of a material from which the sealant will drain, and immediately following each dipping step the sealant is allowed to drain from between the convolutions of the lower channel before the sealant in the lower channel is cured.

3. The method of making a filter coil, comprising laying a first separator strip with a cord extending along each side edge thereof on a first strip of filtering material that extends laterally beyond the cords, laying on the separator strip a second strip of filtering material having substantially the same width as said first filtering strip, laying on the second filtering strip directly above said first separator strip a second separator strip having substantially the same width as the first separator strip, laying a cord on the second filtering strip along each edge of the separator strip thereon, rolling all of said strips and cords together into a coil having at each end a pair of spiral channels each bounded by the filtering strips and a cord, said cords being thick enough to substantially engage both filtering strips, filling the channels at one end of the coil with a viscous sealant, removing the cord from one of the filled channels to remove the sealant therefrom, curing the sealant in the other channel, filling the channels at the other end of the coil with viscous sealant, removing the cord from the said other channel that is in line with the cured sealant, and curing the sealant in the remaining channel, whereby one edge of one separator strip is exposed at one end of the coil and the other edge of the other separator strip is exposed at the other end of the coil.

References Cited

UNITED STATES PATENTS

| | | | |
|---|---|---|---|
| 3,020,977 | 2/1962 | Huppke et al. | 156—192 X |
| 3,025,963 | 3/1962 | Bauer | 210—493 |

FOREIGN PATENTS 641,550  6/1962  Italy.

EARL M. BERGERT, *Primary Examiner.*

P. DIER, *Assistant Examiner.*